(12) United States Patent
Fuisz et al.

(10) Patent No.: US 9,288,649 B2
(45) Date of Patent: Mar. 15, 2016

(54) SMART TELEPHONY SYSTEMS AND METHODS

(71) Applicants: Richard C. Fuisz, Beverly Hills, CA (US); Joseph M. Fuisz, Surfside, FL (US); Justin R. Fuisz, Los Angeles, CA (US)

(72) Inventors: Richard C. Fuisz, Beverly Hills, CA (US); Joseph M. Fuisz, Surfside, FL (US); Justin R. Fuisz, Los Angeles, CA (US)

( * ) Notice: Subject to any disclaimer, the term of this patent is extended or adjusted under 35 U.S.C. 154(b) by 0 days.

(21) Appl. No.: 13/739,606

(22) Filed: Jan. 11, 2013

(65) Prior Publication Data

US 2014/0200039 A1    Jul. 17, 2014

(51) Int. Cl.
| | |
|---|---|
| *H04W 68/00* | (2009.01) |
| *H04W 4/20* | (2009.01) |
| *H04M 19/04* | (2006.01) |
| *H04M 1/725* | (2006.01) |

(52) U.S. Cl.
CPC ............... *H04W 4/20* (2013.01); *H04M 19/04* (2013.01); *H04M 1/72552* (2013.01)

(58) Field of Classification Search
CPC ....... H04W 68/00; H04W 4/20; H04M 19/04; H04M 1/72552
USPC ...................... 455/458, 415–417, 466, 412.1; 379/373.01, 93.23, 207.04
See application file for complete search history.

(56) References Cited

U.S. PATENT DOCUMENTS

| | | | |
|---|---|---|---|
| 5,396,636 A | | 3/1995 | Gallagher et al. |
| 6,834,101 B1 * | | 12/2004 | Pershan ................... 379/207.04 |
| 7,496,352 B2 | | 2/2009 | Kaminsky et al. |
| 7,539,532 B2 | | 5/2009 | Tran |
| 8,260,366 B2 | | 9/2012 | Gilbert et al. |
| 2003/0112931 A1 * | | 6/2003 | Brown et al. ............... 379/93.23 |
| 2003/0191676 A1 * | | 10/2003 | Templeton ......................... 705/8 |
| 2004/0066932 A1 * | | 4/2004 | Seligmann ............... 379/373.01 |
| 2007/0161412 A1 | | 7/2007 | Nevid et al. |
| 2009/0088168 A1 | | 4/2009 | Varanasi |
| 2009/0252303 A1 | | 10/2009 | Agarwal |
| 2010/0093330 A1 * | | 4/2010 | Bluvband et al. ............. 455/417 |
| 2011/0034154 A1 * | | 2/2011 | Maxfield .................... 455/414.1 |
| 2011/0151852 A1 | | 6/2011 | Olincy et al. |
| 2012/0020291 A1 | | 1/2012 | Nasielski et al. |
| 2013/0110547 A1 | | 5/2013 | Englund et al. |
| 2013/0343246 A1 * | | 12/2013 | Manyakin et al. ............ 370/310 |

OTHER PUBLICATIONS

International Search Report/Written Opinion, PCT/US2014/010274, Oct. 30, 2014.

* cited by examiner

*Primary Examiner* — Wayne Cai
(74) *Attorney, Agent, or Firm* — Fitch, Even, Tabin and Flannery LLP

(57) ABSTRACT

A telephonic system and method alert a called phone of an importance level of a call. The system includes a caller module including a caller user interface configured to allow a caller to assign an importance level to a call and instructions when executed cause a processor to initiate transmission of a data message to the dialed number phone that, when received by the called phone, advises the called phone of the importance level of the call incoming, and then initiates the call to the called phone. The system includes a called phone module including a called phone user interface and instructions when executed cause a processor to determine the importance level of the call based on the data message and provide a signal to the called phone user interface concerning the importance level of the call. A proximity feature system and a reverse proximity feature system are also described.

24 Claims, 4 Drawing Sheets

SMART TELEPHONY SYSTEMS AND METHODS

BACKGROUND OF THE INVENTION

The current invention relates to advanced telephony features made possible through novel methods that may be employed using the "smart" phones of today.

Smart phones have proliferated globally. They possess ever increasing processing power. Smart phones function essentially as handheld computers that use modern data and radio networks, for a variety of purposes.

What is interesting is that for all the creativity of smart phone application developers—who have delivered a breathtaking array of applications (or "apps")—and for all of the processing power of smart phone chips and the sophistication of their operating systems, the functionality of smart phone telephony is entirely traditional. The smart phone, as a phone, is "dumb."

Prior art has taught certain various advanced telephony features and methods, but with very limited exceptions, such advanced features and methods have not been deployed in the marketplace. However, from a user's perspective, caller identification, call waiting, and three-way calling have been the only real advances in telephony functionality. Minor "advances" include such features as caller-specific ringtones and caller-specific pictures. Even the voice-IP based telephony systems like Microsoft's Skype® essentially mimic traditional telephony.

Aupperle et al. (US 2004/0213401 "Ring-Tone Identification of Urgent Phone Calls") teaches a caller-specific ringtone wherein approved callers may use a special "urgent" ring. The system uses "any identifying aspect of the caller, including a calling node phone number, a caller name associated with the calling node phone number, a passphrase, or other identifying data" (para 19). In its preferred embodiment, this system uses the public switched telephone network (PTSN).

Gonzalez et al (US 2005/0207556 "Calling Party Ringtone Selection in Telephone System") teaches a system for added ringtone functionality (i.e. "routine, special urgent, an emergency or the like" (para 6)) that is preferably sold as a subscription feature to a telephone user and preferably deployed on an Advanced Intelligent Network (AIN). Still, it is evident that Gonzalez, if not strictly limited, is oriented towards the use of traditional several wire line telephone system LATA's (Local Access and Transport Areas). All of the telephony functionality and features disclosed by Aupperle and Gonzalez is expressly incorporated herein.

There are apparent deficits to the teachings of Aupperle and Gonzalez to which we can attribute the failure of the telephony marketplace to adopt these systems. Aupplerle's reliance on the use of a "passphrase or other identifying data" is cumbersome in practical use. Where a caller name is used to automatically generate a special ring—per Aupperle—the system is entirely indiscriminate as between a true emergency call (sick child) and a mundane one ("don't forget to pick up bread").

Moreover, the inherent challenges of deploying such functionality on the PTSN are a factor. Similarly, Gonzalez requires deployments of "Advanced Intelligent Networks" through traditional LATA's representing a significant challenge.

What is needed is a more flexible method that can more easily deployed over existing networks and devices and supporting advanced functionalities for the consumers well as new telephony functionalities developed in the future.

DISCLOSURE OF THE INVENTION

One purpose of this invention is to solve these and other common issues that one faces with phones or cell phones in particular. Firstly, it is a common human experience to be in occasions wherein phone interruption is not desired. On the other hand, on these same occasions, one has lingering concern that certain prime importance calls, either personal, family or business will be ignored. This can be anxiety provoking and also just not ideal for a smart phone. This invention solves this such that the caller can self identify a prime call for the called phone. If it be abused by the prime caller that number can be blocked in the future.

The second situation is one in which the called phone is either on an automobile system, such as, but not limited to, Bluetooth, and/or on a speaker phone equivalent, and every occupant of the car and/or bystanders can hear the conversation. This may not be desirable for the caller or the person called or both. This application solves that problem by giving an indication as soon as possible to the caller that the called phone is in this type of situation. It is not always possible to pick up the phone and "announce" that others are present without putting the "others" in a seeming negative light. The reciprocal can also be achieved—i.e., the caller alerting the called that the caller is in a public setting.

The present invention posits the use of a new hybrid communication methodology. In the primary embodiment, a user interface for the smart phone user seamlessly connects to a software application on the phone itself which uses sms or text or data messaging to provide special information in conjunction with the originated phone call prior to (or contemporaneously with) it being originated. Such a call will most commonly originate form a wireless handset to a wireless handset but the system may be adapted to non-wireless sets as well (e.g. from a VoIP telephony enabled computer to a wireless phone, from a wireless phone to a VoIP telephony enabled computer, etc).

Figure 1:
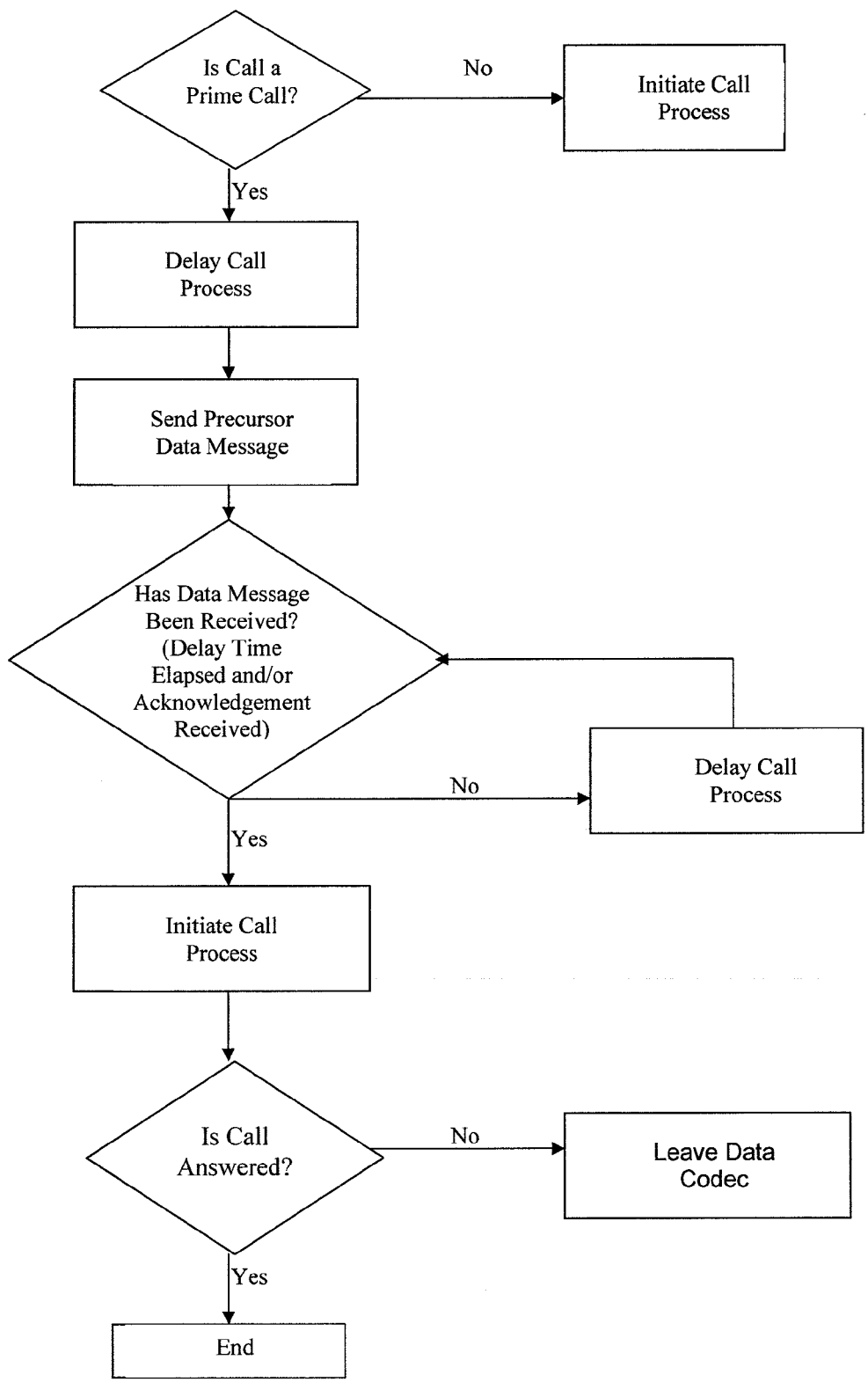
FIG. 1 is a flow chart showing the logic flow of the "Prime Call" feature in the caller module of the caller device.
Figure 2:
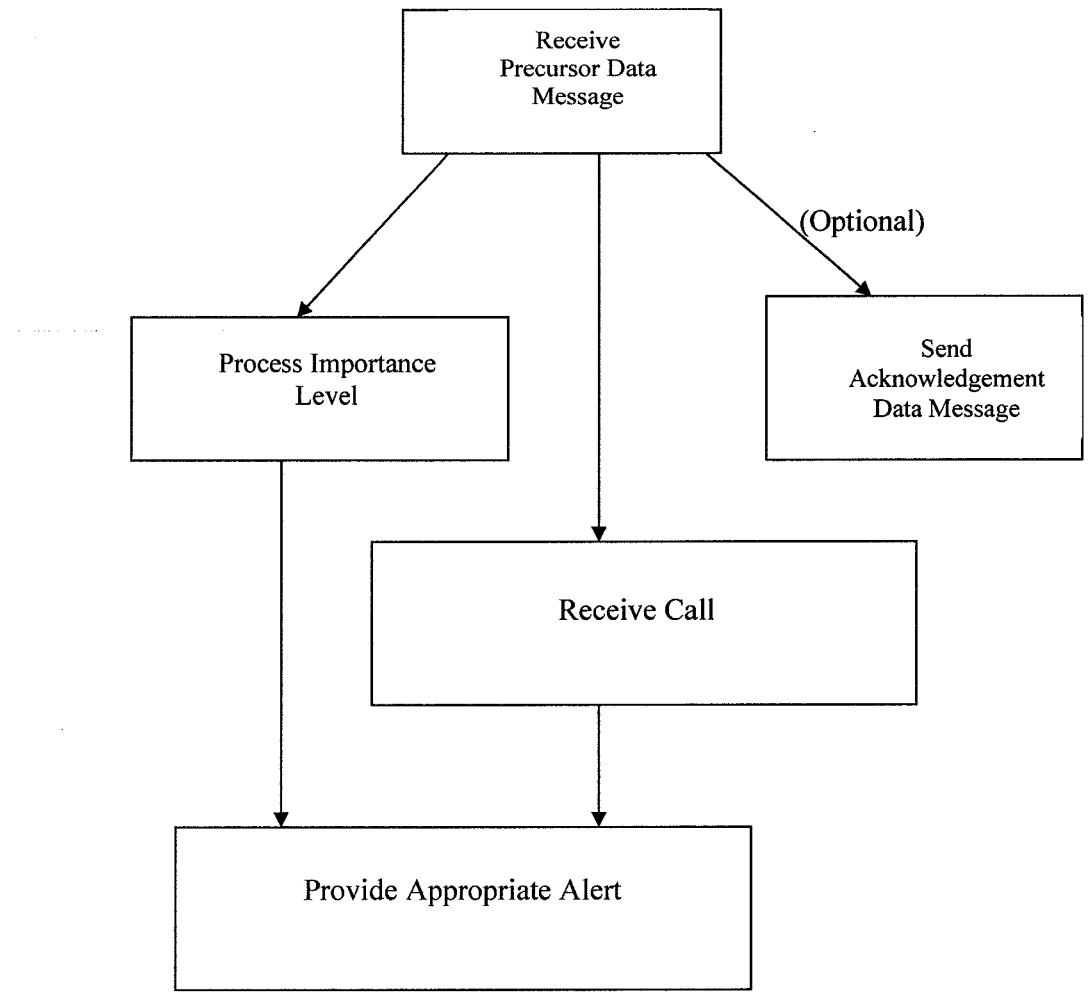
FIG. 2 is a flow chart showing the logic flow of the "Prime Call" feature in the called phone module of the called device.

One non limitative example of an advanced functionality that may be so deployed is a "Prime Call" functionality as shown by way of example in FIGS. 1 and 2, in which FIG. 1 is a flow chart showing the logic flow of the "Prime Call" feature in the caller module of the caller device, and FIG. 2 is a flow chart showing the logic flow of the "Prime Call" feature in the called phone module of the called device. As shown in FIG. 1, a caller elects to initiate a prime call, i.e., a call the caller designates as important and should be answered by the user of the receiving phone even if, for example, the receiving phone is already in use or set to otherwise be in silent mode, and presses a "prime" button on his smart phone interface prior to, or substantially contemporaneously with, placing said call. Using the data capability and speed of sms/text/data messaging, the originating phone alerts the receiving phone of an incoming Prime Call, which sms/text/data precursor message is typically received prior the voice line becoming connected or soon thereafter while ringing. In order to insure this, the call process is delayed from 0.0001 second up to 15 seconds, until such time as delivery of the data message from the caller phone is either confirmed as delivered internally or the delay time has elapsed. As shown in FIG. 2, the receiving phone may then respond with an appropriate Receiving Functionality since it has been pre alerted that a Prime Call is incoming from the caller phone number. Such Receiving Functionality may involve giving a special priority to the incoming Prime Call, placing it as not simply an ordinary incoming call. Receiving Functionality may further comprise special rings, vibrations, visual alerts such as lights or special displays on a receiving phones screen, any combination thereof, or any other appropriate cues. Prime calls may, for example, provide an alert (ringtone, vibration or visual alert) even if the receiving phone is set to otherwise be in silent mode. For example, if the called phone or its ringer were turned OFF, it would be possible for the prime call to trigger the on circuitry, at least but not limited to, allowing for a notification to occur on the called phone. Prime calls may optionally interrupt an existing, non prime call. Receiving Functionality may be a default setting or may be customized by the receiving phone's user. In addition if the phone is not attended and/or unanswered, the call received display will give primacy to the "prime" call with any means of display needed as well as temporally placing this call/message first in line on the called phone.

This "Prime Call" feature can also be automatically associated with certain or automatically employed by devices, e.g., medical related devices that initiate phone calls or send messages to a receiving phone.

In the event that the phone is not answered for whatever reason, either purposely, because it is not attended or the power is low, etc., the caller phone leaves data codec that makes it clear by what ever means needed, vibration, appearance, sounds etc., that a prime call was received and was not answered. This is to separate it from other none prime calls received. Also such missed prime call notices and/or voicemails appear first in line regardless of when it was received relative to "normal" calls.

"Prime Call" functionality may be employed by non-human callers, including but not limited to medical related device including but not limited to analyzers, heart rate monitors, emergency call buttons from the elderly, etc. For example, where medical analyzer devices are deployed that have an alert feature (e.g. when a threshold value of potassium is exceeded), the device may alert the doctor, patient or other person of the alert. In such case, it is may be desirable for the analyzer device to be set to automatically identify such call as a "prime call". The disclosures of U.S. Pat. No. 7,824,612, invented by two of the current applicants, discussing bodily fluid analyzer functionality generally, is hereby incorporated herein by reference.

Typically, the "call" is a voice call, either a human voice call or a synthesized voice call. However, it is possible in some cases, especially in the case of a non-human caller, i.e., when the caller device is an electronic device such as a medical device, that the "call" can be a prime text, which provides a distinct alert (ringtone, vibration or visual alert) even if the receiving phone is set to otherwise be in silent mode for text messages. The prime text of coarse still follows the data message identifying it as prime even though it itself be a text message. This can apply to the prime call in general in that it can be a prime text if preferred for some reason.

The "Prime Call" feature can also be used for national security issues, homeland security, home or business security systems, critical manufacturing subsystems, etc.

Figure 3:
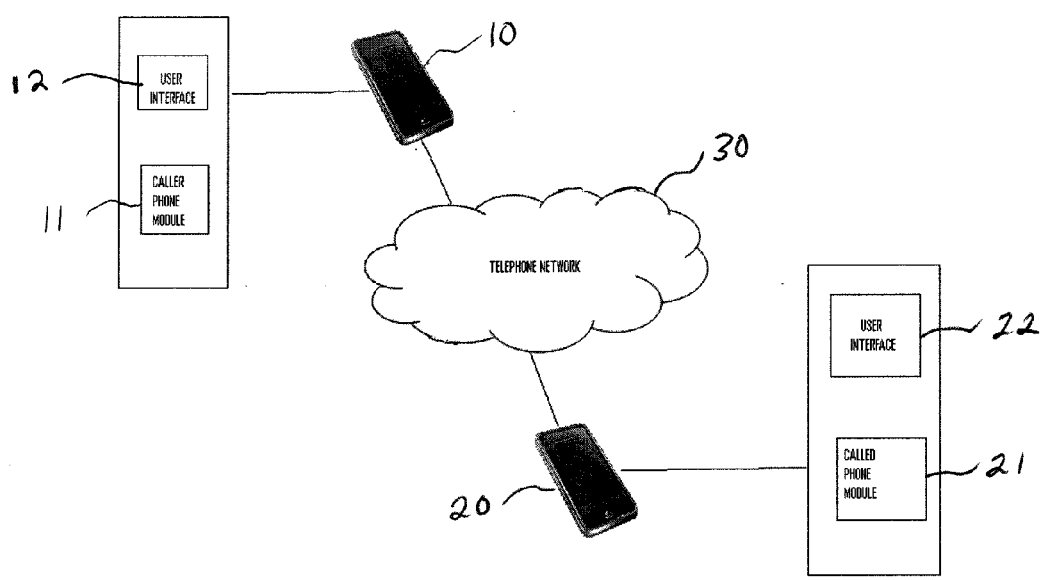
FIG. 3 is a simplified system diagram of the "Prime Call" feature.

FIG. 3 is a simplified system diagram of the "Prime Call" feature. As shown in FIG. 3, the "Prime Call" system is implemented on a caller device 10, which may be a smartphone or other electronic device, e.g., a medical device, and a called phone 20 connected by a telephone network 30, which may be but is not limited to a mobile or cellular phone network, VoIP, etc. Typical components of the caller device 10, called phone 20 and telephone network 30 are not shown since they would be understood by those skilled in the art. The caller device 10 includes a caller module 11 including a caller user interface 12 configured to allow a caller to assign an importance level to a call. The caller module 11 includes instructions when executed cause a processor to first initiate transmission of a data message to the called phone 20 that, when received by the called phone 20, advises the called phone 20 of the importance level of the call incoming, and then initiates the call to the called phone 20. The called phone 20 has a called phone module 21 including a called phone user interface 22 and instructions when executed cause the processor of the called phone 20 to determine the importance level of the call based on the data message and provide a signal to the called phone user interface 22 concerning the importance level of the call.

Figure 4:
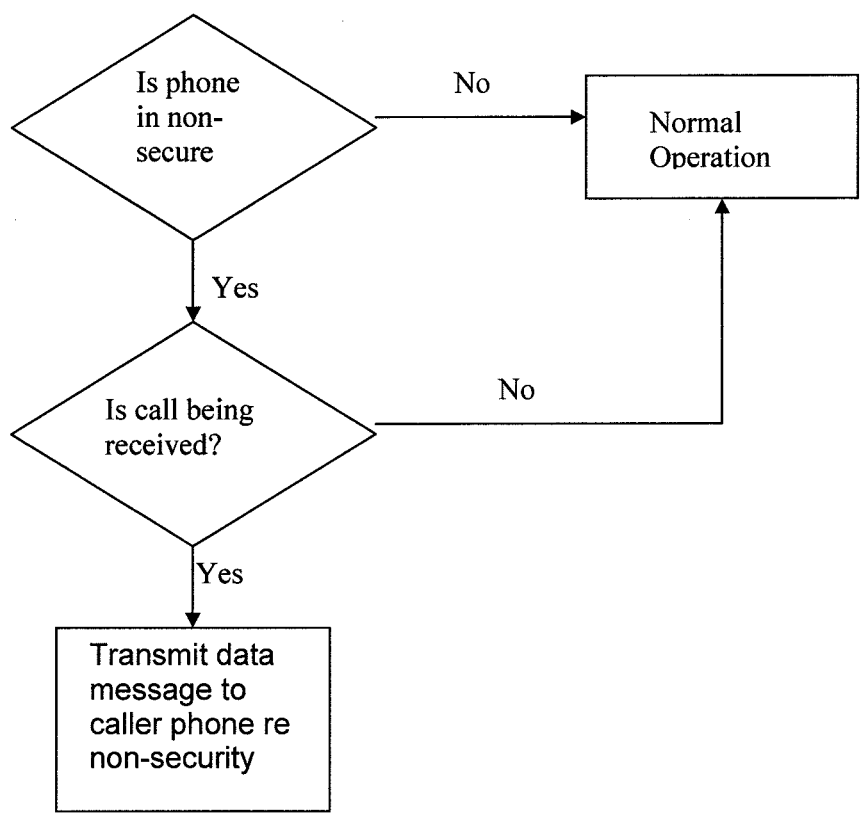
FIG. 4 is a flow chart showing the logic flow of the "Proximity" feature.

A second feature, the logic flow of which is shown in FIG. 4, results in the called phone automatically (or electively through the use of a proximity button) sending a proximity data message to the caller so that as the call is ringing or picked up, the caller is alerted by any means possible, that the called phone is in proximity mode. Such mode may be used when the called or potentially called person is using a speaker type phone, or is in close proximity with others (e.g., on public transportation, e.g., on the Acela® train). The called phone can self initiate this inquiry on the called phone when proximity is pre-selected by the phone's user, or proximity has been automatically set by the called phone to determine of a lack of confidentiality, determined (for example, the phone's GPS or a triangulation determines the phone is traveling on the Acela northeast corridor train or the called phone determines it is connected to a non-confidential speaker).

In addition, the connection of the called phone, it is envisioned, will be able to differentiate between a connection to a speaker, e.g., car speaker system as opposed to a confidential earpiece, and perform this function automatically. The utility of this feature will be especially important for certain professionals like bankers or lawyers who frequently travel while dealing with sensitive matters (see, e.g., http://abovethelaw-.com/tag/acela-bob/ "Acela Bob, Meet Acela Jim: Kelley Drye Managing Partner Conducts Confidential Conversation on Packed train").

Thus, the proximity feature system includes at least a called phone module comprising a called phone interface and instructions when executed cause a called phone called by a caller phone to transmit a data message and subsequent indication on the caller phone, that the called phone is in a no secure mode for privacy. The interface can be a called user interface configured to allow a called phone user to manually select the proximity feature for a single call or for all calls received while selected. The interface can be one that automatically detects, e.g., the phone's GPS or a triangulation, that the phone is traveling on a train or that the called phone is connected to a non-confidential speaker.

This proximity feature (and other features) may also be deployed using a "push" method. For example, a user may use push to other users of the same or a compatible app via text/sms/data messaging in advance (and in anticipation of calls from one or more of said users) that he or she is using speaker phone in the presence of or close proximity with others to alert any persons originating a call (so our Acela attorney can tell his/her working group that he/she is in a public place before they actually call him). Or, a user may push an alert to a pre-determined user group that will indicate to them—in the event they attempt to said user, that the user is busy (and so only important calls should be placed) ("busy mode"). Notably, such alerts can be silent—meaning—they only come to the attention of a would-be-caller in the event a would be caller attempts to dial. Otherwise, the person to whom the text/sms/data is pushed is undisturbed. Of course it is understood that the text/sms/data message is not a text message in the traditional sense but simply a method of transmitting information from one phone to another.

A related functionality that is essentially the reciprocal to proximity functionality enables a caller to send a pre call confidential subject matter data message so that the recipient (i.e. the called) understands that the call will deal with a confidential subject matter and thus the call recipient can take appropriate precautions as a result. The called phone can suggest via a delay button on his handset which results in a data message generated to the calling phone that it is best to delay the call for confidentiality reasons.

A would-be receiving caller may also wish to push alerts to a pre-determined user group that he or she is traveling abroad, and that he or she will be in a different time zone. Or, he may wish pre-determined users to know that expensive roaming charges apply. Interactivity may be built into the system as a result, as in a query such as, "international roaming charges will apply for receiver, do you wish to proceed?" or "it is two am local time for the to-be-called person—do you wish to continue?" or the like.

To emphasize, a substantial advantage (and advance) of the present system is to deploy advanced telephony features without making changes to existing telephony networks and their hubs. This system can be deployed by both sender and receiving users downloading application software, most commonly to a smart phone but also to a personal computer or other capable device.

It is apparent that GUI's can be customizable by users to make valued advanced telephony features easy to access and use.

As noted above, the smart phone's GPS or triangulation capability may be utilized together with a logic system to help automate the deployment of features (for example automatically determining that a user is on a train or in an airport). Other cell tower and wifi data may be similarly employed. For example, a wifi network may indicate that the phone is at work, or at home (give the identities of these networks). Or a hotel wifi network may indicate travel, setting off certain default features.

Advanced wireless data connections allow for simultaneous voice/data transmissions. As a result, via the simultaneous data and voice transfer; the system for routing calls can be sending and receiving data in real time. This allows for real time exchange from commencement through conclusion of a call, and can allow for Pendent Functionality (i.e. functions during the pendency of the call). For example, USER A begins calls at office and circumstances change such that the caller is now in a public place, or using a speakerphone. Such alerts may be based on a user-originated basis (i.e. the user presses a button on the GUI), or automatic (for example, the user connects to a speakerphone through Bluetooth) and so alerts the caller that circumstance have changed relative to confidentiality As will be understood, functionality that is based upon sending of sms/text/data precursor messages may be adapted for simultaneous data and voice transfer, i.e. Pendent Functionality.

The term "data message" shall refer to sms/text/data messages or a combination thereof.

EXAMPLE

Two Apple I phone 4s units were used, each with different number, and both with Verizon wireless service. Both phones were in the same location. Times were measured with a Ball Stopwatch.

First, a text message was sent from one phone to the other. The timer started at the instant the text was sent. The timer stopped when the other phone signaled receipt. This was performed five times with results as follows: test 1) 6 seconds; test 2) 5 seconds; test 3) 7 seconds; test 4) 6 seconds; and test 5) 6 seconds Next the same procedure was used for a phone call. The timer started when call initiated and stopped when other phone indicated receipt of call. This was performed five times with results as follows: test 1) 12 seconds; test 2) 13 seconds; test 3) 13 seconds; test 4) 12 seconds; and test 5) 13 seconds.

Therefore, this test shows there is more than adequate time for the text data message to pre-warn the receiving phone of the type of incoming call (or provider other originator precursor information) from this particular number.

The phones environment should also be taken into account when deciding how best to handle a call based on user specifications.

We claim:

1. A telephonic system for alerting a called phone of an importance level of a call, comprising a first processor, a caller module comprising a caller user interface configured to be provided on a caller device and to allow a caller to assign from the caller device an importance level to a call and instructions when executed cause the first processor to first initiate transmission of a data message from the caller device to the called phone that, when received by the called phone, advises the called phone of the importance level of the call incoming, to determine, by the caller device, whether sufficient time has passed for the data message from the caller device to be received by the called phone, and, based on the determination of whether sufficient time has passed for the data message from the caller device to be received by the called phone, to then initiate the call from the caller device to the called phone; and a second processor, a called phone module comprising a called phone user interface configured to be provided on the called phone and to receive the data message from the caller device, and including instructions when executed cause the second processor to determine the importance level of the call based on the data message and provide a signal to the called phone user interface concerning the importance level of the call.

2. The telephonic system according to claim 1, wherein the importance level includes a prime call designation for important phone calls.

3. The telephonic system according to claim 1, wherein the signal to the called phone user interface comprises at least one of a ringtone, vibration and a visual alert.

4. The telephonic system according to claim 1, wherein the data message comprises at least one of a sms message, a text message and a data message.

5. The telephonic system according to claim 1, wherein the caller user interface determines whether sufficient time has passed for the data message from the caller device to be received by the called phone by receiving a delivery confirmation from the called phone.

6. The telephonic system according to claim 1, wherein the caller user interface determines whether sufficient time has passed for the data message from the caller device to be received by the called phone determining whether a predetermined delay time has elapsed.

7. The telephonic system according to claim 1, wherein the caller module is provided in a medical related device.

8. The telephonic system according to claim 1, wherein the caller module is provided in a device selected from the group consisting of a medical analyzer, a heart rate monitor and an emergency call button.

9. The telephonic system according to claim 1, wherein the called phone module includes instructions that when executed cause, if the called phone or its ringer is turned OFF, triggering of the ON circuitry of the called phone.

10. The method according to claim 1, wherein the caller is an electronic device.

11. The method according to claim 10, wherein the caller device is a medical related device.

12. The telephonic system according to claim 1, wherein the called phone module includes instructions that when executed cause, if the called phone is turned OFF, triggering of the ON circuitry of the called phone.

13. The telephonic system according to claim 1, wherein the called phone module includes instructions that when executed cause, if the called phone is in silent mode, triggering the circuitry of the called phone to provide an alert.

14. The telephonic system according to claim 13, wherein the alert comprises a vibration or ringtone.

15. A method for alerting a called phone of an importance level of a call, comprising assigning, by a caller or caller device, an importance level to a call, initiating transmission of a data message from the caller device to the called phone that, when received by the called phone, advises the called phone of the importance level of the call, receiving on the called phone the data message from the caller device, determining, by the caller device, whether sufficient time has passed for the data message from the caller device to be received by the called phone, and, based on the determination of whether sufficient time has passed for the data message from the caller device to be received by the called phone, then initiating the call from the caller device to the called phone.

16. The method according to claim 15, wherein the importance level includes a prime call designation for important phone calls.

17. The method according to claim 15, further comprising, when the data message from the caller device is received by the called phone, the called phone provides generates at least one of a ringtone, vibration and a visual alert.

18. The method according to claim 15, wherein the data message comprises at least one of a sms message, a text message and a data message.

19. The method according to claim 15, wherein determining whether sufficient time has passed for the data message from the caller device to be received by the called phone comprises the caller device receiving confirmation of delivery of the data message from the called phone.

20. The method according to claim 15, wherein determining whether sufficient time has passed for the data message from the caller device to be received by the called phone comprises determining whether a predetermined delay time has elapsed.

21. The method according to claim 15, wherein the caller device is selected from the group consisting of a medical analyzer, a heart rate monitor and an emergency call button.

22. The method according to claim 15, wherein, if the called phone is turned OFF, the data message causes instructions stored on the called phone to be executed triggering the ON circuitry of the called phone.

23. The method according to claim 15, wherein, if the called phone is in silent mode, the data message causes instructions stored on the called phone to be executed, triggering the circuitry of the called phone to provide an alert.

24. The method according to claim 23, wherein the alert comprises a vibration or ringtone.

\* \* \* \* \*